(12) United States Patent
Gilbergs et al.

(10) Patent No.: US 12,386,039 B2
(45) Date of Patent: Aug. 12, 2025

(54) LIDAR SENSOR AND SURROUNDINGS DETECTION SYSTEM

(71) Applicant: Robert Bosch GmbH, Stuttgart (DE)

(72) Inventors: Holger Maris Gilbergs, Sersheim (DE); Johannes Richter, Ludwigsburg (DE); Karl Christoph Goedel, Vaihingen an der Enz (DE); Simon Bell, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1045 days.

(21) Appl. No.: 17/393,304

(22) Filed: Aug. 3, 2021

(65) Prior Publication Data

US 2022/0043121 A1 Feb. 10, 2022

(30) Foreign Application Priority Data

Aug. 6, 2020 (DE) .......................... 102020209930.8

(51) Int. Cl.
*G01S 7/495* (2006.01)
*G01S 7/481* (2006.01)
G01S 17/931 (2020.01)
G01S 17/933 (2020.01)

(52) U.S. Cl.
CPC ............ *G01S 7/4813* (2013.01); *G01S 7/495* (2013.01); *G01S 17/931* (2020.01); *G01S 17/933* (2013.01)

(58) Field of Classification Search
CPC ........ G01S 7/4813; G01S 7/495; G01S 7/481; B08B 1/165; B08B 3/02
See application file for complete search history.

(56) References Cited

U.S. PATENT DOCUMENTS

| 12,019,186 | B2* | 6/2024 | Osiroff | G01S 7/4914 |
| 2018/0055697 | A1 | 3/2018 | Mihali et al. | |
| 2018/0143709 | A1* | 5/2018 | Stotzem | B60R 16/005 |
| 2018/0284241 | A1* | 10/2018 | Campbell | G01S 7/4868 |
| 2019/0369216 | A1* | 12/2019 | Anderson | G01S 17/42 |
| 2021/0389434 | A1* | 12/2021 | Wang | G01S 17/42 |
| 2023/0243930 | A1* | 8/2023 | Kamil | G01S 7/4813 |
| | | | | 356/4.01 |

FOREIGN PATENT DOCUMENTS

| DE | 102007035905 A1 | 2/2009 |
| DE | 102011081139 A1 | 2/2013 |
| DE | 102019208606 A1 | 1/2020 |
| EP | 2334141 A1 | 6/2011 |

* cited by examiner

*Primary Examiner* — Dominic E Hawkins
(74) *Attorney, Agent, or Firm* — NORTON ROSE FULBRIGHT US LLP

(57) ABSTRACT

A LIDAR sensor, including a window, at least one first group and one second group of electrical conductors, and a detection circuit. The window is a light exit and entry interface of the LIDAR sensor. Each of the groups includes a first conductor and a second conductor, which are situated on and/or within the window, electrically insulated from one another, form a capacitive sensor, and are electrically connected to the detection circuit. The first and second groups are situated at positions which deviate from one another. The detection circuit generates an electrical field between the respective first conductors and second conductors of the respective groups to detect a change in the electrical field as a result of an object in close range of the window, ascertain a position of the object within the surface of the window, and provide a piece of information about the position of the object.

10 Claims, 2 Drawing Sheets

LIDAR SENSOR AND SURROUNDINGS DETECTION SYSTEM

FIELD

The present invention relates to a LIDAR sensor and to a surroundings detection system including such a LIDAR sensor.

BACKGROUND INFORMATION

Vehicles driving in a semi-automated and/or highly automated manner, which use different sensors for an automatic surroundings detection, are conventional in the related art. Optical sensors, such as LIDAR sensors and camera systems, represent a key technology in the field of surroundings sensors. These are generally isolated from surroundings with the aid of a housing. Accordingly, an optical interface of these sensors is usually provided via a window integrated into the housing. To ensure a functional capability of these optical sensors, it is crucial that objects influencing a sensor measurement (e.g., dirt, rain, ice, etc.) on an outer surface of the window may be automatically detected, and preferably also automatically removed.

German Patent Application No. DE 102011081139 A1 describes a sensor system for a motor vehicle which is able to detect a state of a pane and, in particular, a soiling of the pane. The state of the pane is detected by a change in electrical properties of an electrically conducting system situated at and/or in the pane.

European Patent Application No. EP 000002334141 A1 describes an electrically heatable transparent pane including, among other things, an extensive, electrically conductive transparent coating which is applied onto a transparent substrate. The present invention relates, in particular, to panes including communication windows for sensors and camera systems.

SUMMARY

According to a first aspect of the present invention, a LIDAR sensor including a window, at least one first group and one second group of electrical conductors and a detection circuit is provided. The LIDAR sensor is a point scanner or a line scanner, for example, or a Flash LIDAR sensor. The LIDAR sensor is preferably a surroundings sensor of a means of transportation, the means of transportation being a road vehicle (e.g., motorcycle, passenger car, delivery van, truck) or a rail vehicle or an aircraft/airplane and/or a water craft, for example, without thereby limiting the LIDAR sensor to an exclusive use with a means of transportation.

The window, which is manufactured from glass and/or a transparent plastic, for example, is a light exit and a light entry interface of the LIDAR sensor. The respective groups of electrical conductors in each case include a first conductor and a second conductor, which are situated on and/or within the window, in each case electrically insulated from one another, and in each case form a capacitive sensor, and which are each electrically connected to the detection circuit.

The first group and the second group of electrical conductors are furthermore situated at positions which deviate from one another. The detection circuit is furthermore configured to generate an electrical field between the respective first conductors and the second conductors of the respective groups with the aid of a voltage source, to detect a change in the electrical field as a result of an object in the close range of the window, to ascertain a position of the object within the surface of the window, and to provide a piece of information about the position of the object. The object is, for example, a soiling and/or a wetness and/or ice, etc., the object being configured to influence a laser beam, emitted and/or received by the LIDAR sensor, with respect to its intensity and/or shape.

The option of being able to ascertain a position of the object in the area of the window surface yields an advantage that measures for eliminating and/or for handling such a view-impairing object may be carried out in a deliberate manner, and do not have to be carried out in the area of the entire window surface. In this way, it is possible, for example, to reduce a wear of the window surface and/or a duration for carrying out a measure for eliminating and/or for handling such objects. This advantage may accordingly be utilized particularly effectively when a higher number than two of groups of electrical conductors is used, so that objects on the window of the LIDAR sensor are localizable with an accordingly higher accuracy.

Preferred refinements of the present invention are described herein.

In one advantageous embodiment of the present LIDAR sensor, the respective first conductors and second conductors of the respective groups are electrically conducting wires and/or electrically conducting layers. Advantageously, these are linearly situated, the linear arrangement preferably taking place in such a way that respective first conductors and respective second conductors are in each case situated in parallel to and alternating with one another. As an alternative, the respective first conductors and respective second conductors are situated in a loop-shaped (or meander-shaped) manner, the loop-shaped arrangement preferably taking place in such a way that the respective first conductors and second conductors of a respective group are situated nested inside one another. As a further alternative, the respective first conductors and respective second conductors are situated in a lattice-shaped manner with respect to one another. In addition, arrangements for the respective first and second conductors which differ from the arrangement variants described here are also usable in connection with the present LIDAR sensor.

In the case of a lattice-shaped arrangement of the respective first conductors and respective second conductors, they are preferably situated in such a way that all first conductors are situated at a first predefined angle, and that all second conductors are situated at a second predefined angle deviating from the first predefined angle. The first conductors and the second conductors may basically be situated at an arbitrary angle with respect to one another, preferably however at an angle of 90°. In addition, it is possible that the lattice formed of the first conductors and second conductors is situatable at different angles with respect to the window surface. In addition to a parallel orientation of the respective first conductors and second conductors with respect to the respective edges of the windows, it is also possible that both the first conductors and the second conductors are oriented at an angle of 45° or an angle deviating therefrom with respect to respective edges of the window.

Furthermore, it is possible to configure the window of the LIDAR sensor in such a way that it has a planar surface or a surface having a predefined curvature. Such a predefined curvature consequently also encompasses a cylindrically configured, i.e., circumferential, window.

The respective conductors of the first group of electrical conductors and of the second group of electrical conductors are preferably transmissive, or essentially transmissive, to the light emitted by the LIDAR sensor so as not to influence, or to influence only insignificantly, a recognition performance of the LIDAR sensor. As an alternative to a transmissive configuration of the respective first and second conductors, it is also possible to use very thin electrical conductors that are not or only partially transmissive, which also only insignificantly influence the emitted and/or received laser light of the LIDAR sensor.

In a case in which the LIDAR sensor includes a cylindrical window (e.g., in the case of a 360° scanner), the respective conductors of the first group of electrical conductors and the respective conductors of the second group of electrical conductors are preferably spirally designed along the circumference of the cylindrical window, a linear, loop-shaped or lattice-shaped design of the respective conductors explicitly not being excluded thereby in such a configuration of the LIDAR sensor.

The LIDAR sensor is particularly preferably configured to apply a voltage, in particular, a DC voltage, to a portion of or to all conductors of the particular groups of electrical conductors, so that a resulting current flow results in a heating of the respective electrical conductors and their surroundings on the window. In this way, the advantage of a localization of objects on the window of the LIDAR sensor may advantageously be combined with the advantage of a removal of ice and/or snow and/or moisture etc. due to the window being heated by one and the same arrangement of electrical conductors. By using the aforementioned DC voltage for the heating, and an AC voltage for generating the electrical field for the capacitive detection of objects in the vicinity of the window, the two functions of the LIDAR sensor according to the present invention may be circuitry-wise decoupled, so that they do not influence one another, and accordingly are activatable independently of one another.

In one advantageous embodiment of the present invention, the LIDAR sensor is configured to apply a DC voltage only to those conductors of the respective groups of electrical conductors for a heating which are situated in the area of the position of the object. This offers the advantage that not the entire surface, but only areas of the window actually affected by snow and/or ice and/or moisture etc. are heated, by which an accordingly lower energy expenditure is required for removing interfering objects. An activation of respective areas to be heated is possible, for example, by an evaluation unit according to the present invention, which receives pieces of information about the positions of objects on the window from the detection circuit. As an alternative, it is also possible that the detection circuit and the evaluation unit are one and the same component.

In one particularly advantageous embodiment, the LIDAR sensor is configured, using the piece of information about the position of the object, to carry out a cleaning of the LIDAR sensor in the area of the position of the object and/or to increase a transmission power and/or a reception sensitivity of the LIDAR sensor in the area of the position of the object. A cleaning of the LIDAR sensor or of the window of the LIDAR sensor takes place, for example, with the aid of splash water nozzles and/or compressed air nozzles and/or a windshield wiper. An increase in the transmission power and/or an increase in the reception sensitivity of the LIDAR sensor offers the advantage that objects in the area of the window (depending on transparency) do not, or do not directly, have to be removed (e.g., in a case in which the LIDAR sensor does not include a cleaning device) since their interfering influence is at least partially compensatable with the aid of above-described counter measures. A respective activation of a cleaning device and/or of a light emitter and/or of a light detector of the LIDAR sensor preferably also takes place with the aid of the above-described evaluation unit.

According to a second aspect of the present invention, a surroundings detector system is provided, which includes a LIDAR sensor according to the above description. The features, feature combinations as well as the advantages resulting therefrom correspond to those provided in connection with the former aspect of the present invention in such an apparent way that reference is made to the above comments to avoid repetition. Such a surroundings detection system, which is a surroundings detection system of a means of transportation, for example, is preferably configured to adapt an evaluation of pieces of surroundings information of the LIDAR sensor and/or to output an information message to a user of the surroundings detection system based on the piece of information about the position of the object. An implementation of these measures preferably also takes place with the aid of the above-described evaluation unit.

BRIEF DESCRIPTION OF THE DRAWINGS

Exemplary embodiments of the present invention are described hereafter in greater detail with reference to the figures.

DETAILED DESCRIPTION OF EXAMPLE EMBODIMENTS

Figure 1:
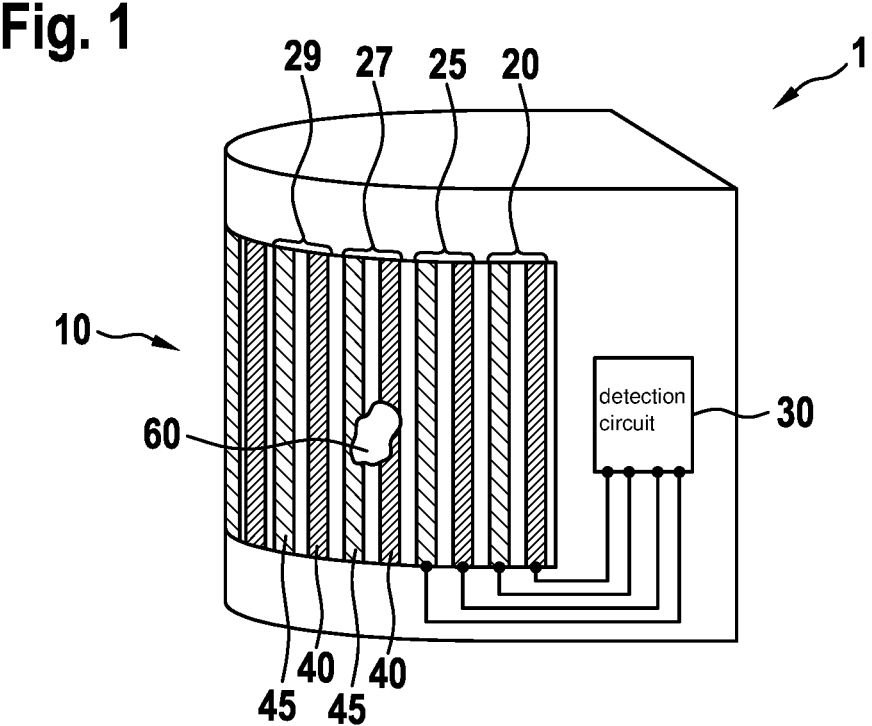
FIG. 1 shows a schematic view of a LIDAR sensor according to the present invention in a first specific embodiment.

FIG. 1 shows a schematic view of a LIDAR sensor 1 according to the present invention in a first specific embodiment. LIDAR sensor 1 includes a curved window 10, which is manufactured from glass here. LIDAR sensor 1 furthermore includes a detection unit 30, which is electrically connected to a multitude of strip-shaped first electrical conductors 40 and second electrical conductors 45, which are situated in an alternating manner on window 10. Electrical conductors 40, 45 are designed in strip-shaped layers here, and are transmissive to a laser light generated by LIDAR sensor 1 for a surroundings detection. Respectively adjoining first electrical conductors 40 and second electrical conductors 45 form a respective group 20, 25, 27, 29 of electrical conductors. The respective first electrical conductors 40 and second electrical conductors 45 of a respective group 20, 25, 27, 29 are electrically insulated from one another and are used to generate respective electrical fields, to form a respective capacitive sensor in this way by each group 20, 25, 27, 29. In this way, the LIDAR sensor 1 is able to register capacitive changes as a result of an object 60 on window 10 with the aid of detection circuit 30 and to ascertain a position of object 60 on window 10. Here, a present object 60 is ascertained in the area of second group 25 of electrical conductors.

This piece of information is advantageously communicated to an evaluation unit 70 connected to detection circuit 30 in terms of information technology, which is configured to increase a reception sensitivity of a light detector of LIDAR sensor 1 in an area which corresponds to the ascertained position of object 60.

The respective first electrical conductors 40 and second electrical conductors 45 are preferably separately contactable with a DC current source via their respective ends, so that the surface of window 10 is additionally selectively heatable to selectively remove ice and/or snow from window 10.

Figure 2:
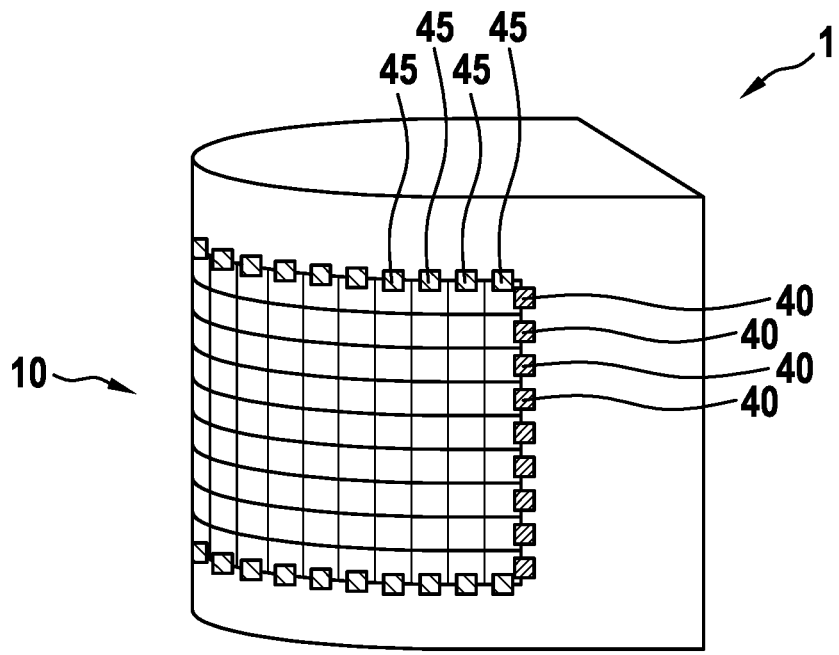
FIG. 2 shows a schematic view of a LIDAR sensor according to the present invention in a second specific embodiment.

FIG. 2 shows a schematic view of a LIDAR sensor 1 according to the present invention in a second specific embodiment. Here, the respective first electrical conductors 40 and second electrical conductors 45 are situated in a lattice-shaped manner with respect to one another, so that an ascertainment of the position of an object 60 potentially adhering to window 10 takes place with a higher accuracy than in specific embodiment 1, in which a position is only determinable in each case in the entire area of a strip-shaped group. In contrast, it is possible here to ascertain a position of an object 60 in the area of respective intersections of first electrical conductors 40 and second electrical conductors 45.

Figure 3:
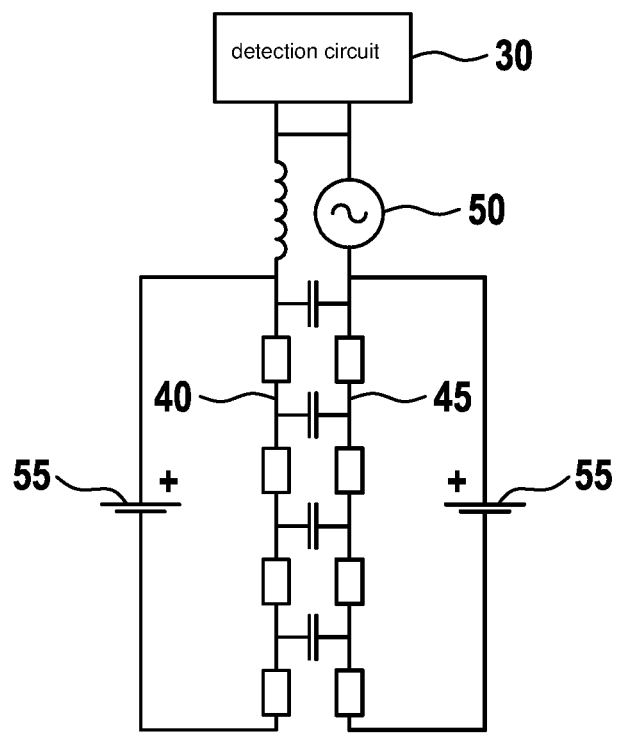
FIG. 3 shows an exemplary circuit system of a LIDAR sensor according to an example embodiment of the present invention.

FIG. 3 shows an exemplary circuit system of a LIDAR sensor 1 according to the present invention, which includes a detection circuit 30, a DC voltage source 55, and an AC voltage source 50. Respective wires 40, 45 in each case have an electrical resistance and together form a capacitor. In the case of a present object 60 (e.g., rain drops) in the area of the two wires 40, 45, a change in the capacitance of the capacitor thus formed is registered by detection circuit 30. Such a change in capacitance is specifically established here in that an accompanying change of an alternating current generated by AC voltage source 50 is registered. A current generated by DC voltage source 55 in each wire 40, 45 is additionally used for a heating of the respective wires 40, 45.

Figure 4:
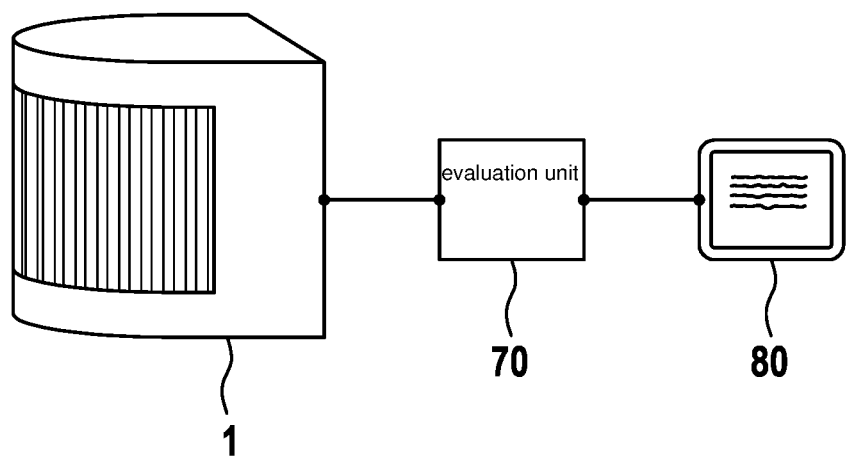
FIG. 4 shows a schematic view of a surroundings detection system according to the present invention.

FIG. 4 shows a schematic view of a surroundings detection system according to the present invention. The surroundings detection system includes a LIDAR sensor 1, which is connected to an evaluation unit 70 in terms of information technology. Evaluation unit 70 is configured to evaluate measuring signals generated by LIDAR sensor 1 and to ascertain surroundings of LIDAR sensor 1 based on the measuring signals. Based on a piece of information, generated by LIDAR sensor 1, about a position of soiling present on window 10 of LIDAR sensor 1, evaluation unit 70 is configured to increase a transmission power of LIDAR sensor 1 in this area to counteract a signal attenuation due to the soiling. Evaluation unit 70 is furthermore configured, in the case of soiling which is not compensatable by an increase in the transmission power, to output a corresponding information message via a display 80 to a user of the surroundings detection system.

What is claimed is:

1. A LIDAR sensor, comprising:
   a window;
   at least one first group of electrical conductors and at least one second group of electrical conductors; and
   a detection circuit;
   wherein the window is a light exit and light entry interface of the LIDAR sensor;
   wherein each of the first group of electrical conductors and the second grouped of electrical conducts includes a first conductor and a second conductor, which are, in each case:
      electrically insulated from one another, situated on and/or within the window and in each case form a capacitive sensor, and
      electrically connected to the detection circuit;
   wherein the first group of electrical conductors and the second group of electrical conductors are situated at positions which deviate from one another; and
   wherein the detection circuit is configured to:
      generate an electrical field at least between the respective first conductors and second conductors of the first and second groups, using a voltage source,
      detect a change in the electrical field as a result of an object in close range of the window, and to ascertain a position of the object within the surface of the window, and
      provide a piece of information about the position of the object.

2. The LIDAR sensor as recited in claim 1, wherein the first conductors and the second conductors of the first and second groups are electrically conducting wires and/or electrically conducting layers, and are situated in a line-shaped manner, or a loop-shaped manner, or a lattice-shaped manner, with respect to one another.

3. The LIDAR sensor as recited in claim 2, wherein, the first conductors and the second conductors of the first and second groups are situated in a lattice-shaped arrangement, the first conductors and the second conductors are situated in such a way that all first conductors are situated at a first predefined angle, and all second conductors are situated at a second predefined angle deviating from the first predefined angle.

4. The LIDAR sensor as recited in claim 1, wherein the window has a planar surface, or has a surface having a predefined curvature.

5. The LIDAR sensor as recited in claim 1, wherein the first and second conductors of the first group of electrical conductors and of the second group of electrical conductors are transmissive to light emitted by the LIDAR sensor.

6. The LIDAR sensor as recited in claim 1, wherein:
   the window is a cylindrical window, and
   the first and second conductors of the first group of electrical conductors and the first and second conductors of the second group of electrical conductors are configured as spirals along a circumference of the cylindrical window.

7. The LIDAR sensor as recited in claim 1, wherein the LIDAR sensor is configured to apply a DC voltage, to a portion of or to all first and second conductors of the first and second groups of electrical conductors, so that a resulting current flow results in a heating of the respective electrical conductors and their surroundings on the window.

8. The LIDAR sensor as recited in claim 7, wherein the LIDAR sensor is configured to apply a voltage only to those conductors of the first and second groups of electrical conductors for the heating which are situated in an area of the position of the object.

9. The LIDAR sensor as recited in claim 1, wherein the LIDAR sensor is configured to, using the piece of information about the position of the object:
   carry out a cleaning of the LIDAR sensor in an area of the position of the object, and/or
   increase a transmission power and/or a reception sensitivity of the LIDAR sensor in the area of the position of the object.

10. A surroundings detection system comprising:
    a LIDAR sensor, including:
       a window;
       at least one first group of electrical conductors and at least one second group of electrical conductors; and
       a detection circuit;

wherein the window is a light exit and light entry interface of the LIDAR sensor;
wherein each of the first group of electrical conductors and the second groups of electrical conducts includes a first conductor and a second conductor, which are, in each case:
electrically insulated from one another, situated on and/or within the window and in each case form a capacitive sensor, and electrically connected to the detection circuit;
wherein the first group of electrical conductors and the second group of electrical conductors are situated at positions which deviate from one another; and
wherein the detection circuit is configured to:
generate an electrical field at least between the respective first conductors and second conductors of the first and second groups, using a voltage source,
detect a change in the electrical field as a result of an object in close range of the window, and to ascertain a position of the object within the surface of the window, and
provide a piece of information about the position of the object;
wherein the surroundings detection system is configured to, based on the piece of information about the position of the object:
adapt an evaluation of pieces of surroundings information of the LIDAR sensor, and/or
output an information message to a user of the surroundings detection system.

* * * * *